US006167698B1

(12) United States Patent
King et al.

(10) Patent No.: US 6,167,698 B1
(45) Date of Patent: Jan. 2, 2001

(54) EXHAUST GAS PURIFICATION SYSTEM FOR A LEAN BURN ENGINE

(75) Inventors: Edward Thomas King, Dearborn; John Vanderslice, Berkley, both of MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/468,499

(22) Filed: Dec. 21, 1999

(51) Int. Cl.[7] ........................................................ F01N 3/00
(52) U.S. Cl. .................... 60/286; 60/274; 60/281; 60/289; 60/280; 60/307
(58) Field of Search ............................ 60/280, 281, 286, 60/289, 293, 303, 307

(56) References Cited

U.S. PATENT DOCUMENTS

| | | |
|---|---|---|
| 4,615,173 | 10/1986 | Usui et al. . |
| 5,090,200 | 2/1992 | Arai . |
| 5,379,586 | 1/1995 | Honji et al. . |
| 5,404,719 | 4/1995 | Araki et al. . |
| 5,544,483 | * 8/1996 | Heuer ...................................... 60/283 |
| 5,617,720 | * 4/1997 | Achleitner et al. ..................... 60/274 |
| 5,653,101 | * 8/1997 | Lane et al. .............................. 60/274 |
| 5,974,789 | * 11/1999 | Mathes et al. .......................... 60/274 |
| 6,021,639 | * 2/2000 | Abe et al. ............................... 60/297 |

FOREIGN PATENT DOCUMENTS

| | | |
|---|---|---|
| 0 306 630 A1 | 6/1988 | (EP) . |
| 58-128413 | 8/1983 | (JP) . |
| 59-41620 | 3/1984 | (JP) . |

* cited by examiner

*Primary Examiner*—Thomas Denion
*Assistant Examiner*—Binh Tran
(74) *Attorney, Agent, or Firm*—Jerome R. Drouillard

(57) ABSTRACT

An exhaust gas purification system for an engine equipped with a turbocharger and an exhaust pipe having a $NO_x$ conversion catalyst therein. The system comprises a reservoir for storing pressurized air received from the turbocharger, a reductant injector in fluid communication with a reductant supply, and a mixing chamber in fluid communication with the reservoir and connected to the reductant injector. The reductant injector is responsive to an injection signal for atomizing and injecting a quantity of reductant into the mixing chamber. The mixing chamber is in fluid communication with the exhaust pipe for introducing a quantity of air and reductant mixture into the exhaust gas flow upstream of the $NO_x$ conversion catalyst. In one aspect of the invention, the system includes an engine control unit, a valve connected between the reservoir and the mixing chamber, and a differential pressure transducer positioned between the mixing chamber and the exhaust pipe for measuring the pressure differential across the mixing chamber and exhaust pipe upstream of the $NO_x$ conversion catalyst. The engine control unit controls the valve to introduce a quantity of pressurized air from the reservoir into the mixing chamber to maintain the pressure differential between the mixing chamber and exhaust pipe substantially constant.

15 Claims, 1 Drawing Sheet

EXHAUST GAS PURIFICATION SYSTEM FOR A LEAN BURN ENGINE

FIELD OF THE INVENTION

The present invention relates generally to exhaust systems for engines and, more particularly, to an exhaust after-treatment system for a low emission, lean-burn internal combustion engine.

BACKGROUND OF THE INVENTION

Catalysts are generally used as a means for removing pollutants such a HC, CO and $NO_x$ from the exhaust gas of internal combustion engines. The ability of a catalyst to remove $NO_x$ in the exhaust gas falls rapidly, however, when the air-fuel ratio of the exhaust gas becomes leaner. Lean burn engines such as diesel engines, operate at overall air-fuel ratios leaner than stoichiometry. As a result, they have improved fuel economy. On the other hand, conventional three-way catalysts do not function properly at such lean air-fuel ratios because of the relatively high concentration of oxygen in the exhaust gas. For this reason, such engines are typically equipped with a lean $NO_x$ catalyst (LNC) and/or a selective catalytic reduction (SCR) catalyst.

LNC and SCR catalyst can chemically reduce $NO_x$ into the components of $CO_2$, $H_2O$, and $N_2$ by utilizing hydrocarbons in the exhaust gas stream. To increase the $NO_x$ conversion efficiency of such exhaust gas after-treatment systems, injectors are used to inject reductants such as gasoline, diesel fuel or urea into the exhaust gas upstream of the catalyst.

The quantity of reductant injected is very small, and must be finely atomized prior to introduction in the exhaust gas flow upstream of the LNC or SRC. Conventional reductant injection systems utilize an air assisted injector in connection with a series of electrically or mechanically driven air and reductant pumps to introduce the air/reductant into the exhaust stream. Such systems have the obvious drawback of additional cost, noise and weight associated with the separate dedicated electrical or mechanical air and reductant pump system.

SUMMARY OF THE INVENTION

One object of the present invention is to provide an improved exhaust gas purification system. The foregoing and other objects and advantages are achieved through the provision of an exhaust gas purification system for an engine equipped with a turbocharger and an exhaust pipe having a $NO_x$ conversion catalyst therein. The system comprises a reservoir for storing pressurized air received from the turbocharger, a reductant injector in fluid communication with a reductant supply, and a mixing chamber in fluid communication with the reservoir and connected to the reductant injector. The reductant injector is responsive to an injection signal for atomizing and injecting a quantity of reductant into the mixing chamber. The mixing chamber is in fluid communication with the exhaust pipe for introducing a quantity of air and reductant mixture into the exhaust gas flow upstream of the $NO_x$ conversion catalyst. In one aspect of the invention, the system includes an engine control unit, a valve connected between the reservoir and the mixing chamber, and a differential pressure transducer positioned between the mixing chamber and the exhaust pipe for measuring the pressure differential across the mixing chamber and exhaust pipe upstream of the $NO_x$ conversion catalyst. The engine control unit controls the valve to introduce a quantity of pressurized air from the reservoir into the mixing chamber to maintain the pressure differential between the mixing chamber and exhaust pipe substantially constant.

One advantage of the present invention is that it eliminates the cost, weight, and durability concerns associated with a separate dedicated electrically or mechanically driven air pump. Other features and advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings.

DESCRIPTION OF THE PREFERRED EMBODIMENTS

Figure 1:
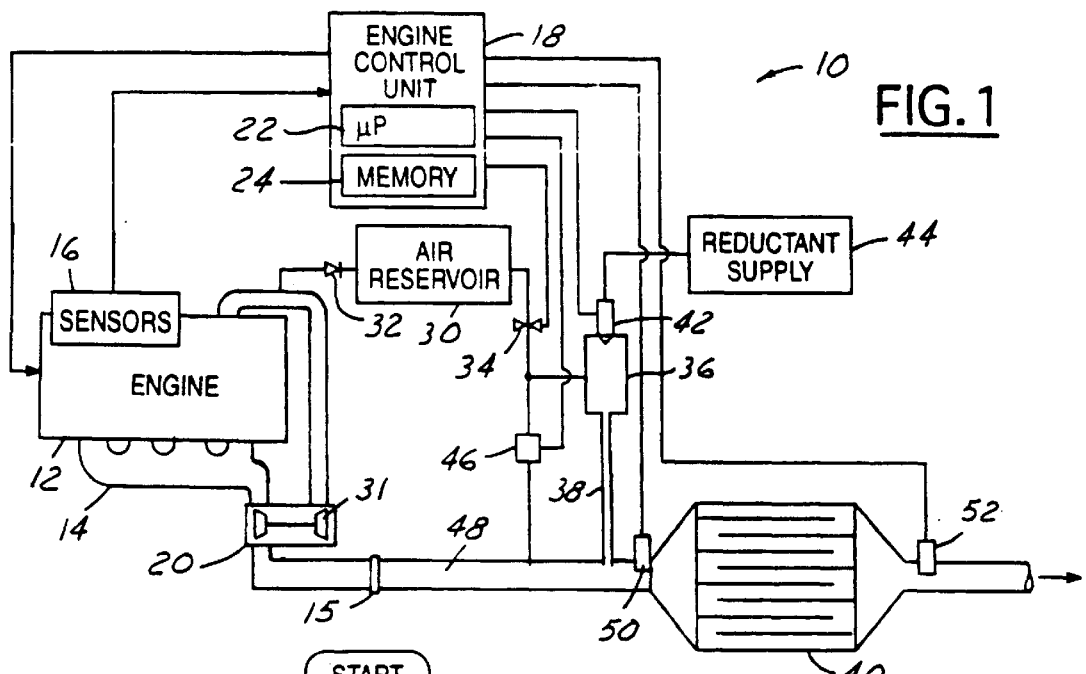
FIG. 1 is a schematic view of an exhaust system according to one embodiment of the present invention illustrating its operational relationship with an internal combustion engine.

Turning now to FIG. 1, an exhaust gas purification system 10 is illustrated in operational relationship with a lean burn internal combustion engine 12 such as a direct injected diesel engine for an automotive vehicle. The engine 12 has an exhaust manifold 14 to direct the exhaust gases from the engine 12 through the turbocharger 20, to the exhaust system 10.

The engine 12 includes sensors, indicated generally at 16, for providing information about engine performance to the engine control unit 18. Such information includes the crankshaft position, camshaft position, accelerator pedal position, air temperature, engine coolant temperature, etc. The information from the sensors 16 is used by the engine control unit 18 to control operation of the engine 12.

The engine 12 further includes a turbocharger 20 for increasing the intake air flow and pressure supplied to the cylinders of the engine 12.

The exhaust gas purification system 10 is coupled to the turbocharger 20 by way of an exhaust flange 15.

The engine control unit 18 is preferably a microprocessor-based controller which provides integrated control of the engine 12 and exhaust gas purification system 10, among other things. Of course, the present invention may be implemented in a separate controller depending upon the particular application. The engine control unit 18 includes a microprocessor 22 in communication with input ports and output ports and associated memory 24. The memory 24 may include various types of volatile and non-volatile memory such as random access memory (RAM), read-only memory (ROM), and keep-alive memory (KAM). These functional descriptions of the various types of volatile and non-volatile storage may be implemented by a number of known physical devices including but not limited to EPROMs, EEPROMs, PROMs, flash memory, and the like.

The exhaust gas purification system further includes a reservoir 30 which receives pressurized air from the compressor portion 31 of the engine turbocharger 20. A check valve 32 prevents the pressurized air from bleeding out of the reservoir 30 and back into the turbocharger 20. An air valve 34 delivers pressurized air from the reservoir 30 into a chamber 36. A passage 38 provides a conduit through which the pressurized air and reductant is introduced into the exhaust gas flow upstream of the LNC or SCR 40.

Reductant is introduced into the chamber 36 by the injector 42 which is supplied from a reductant supply system 44. A differential pressure transducer 46 senses the pressure differential between the chamber 36 and exhaust gas flow 48. This signal is supplied to the engine control unit 18 for use in activating the injector 42 and air valve 34.

An upstream temperature sensor 50 and downstream temperature sensor 52 are also provided upstream and downstream of the LNC or SCR 40, and communicate temperature information to the engine control unit 18.

Figure 2:
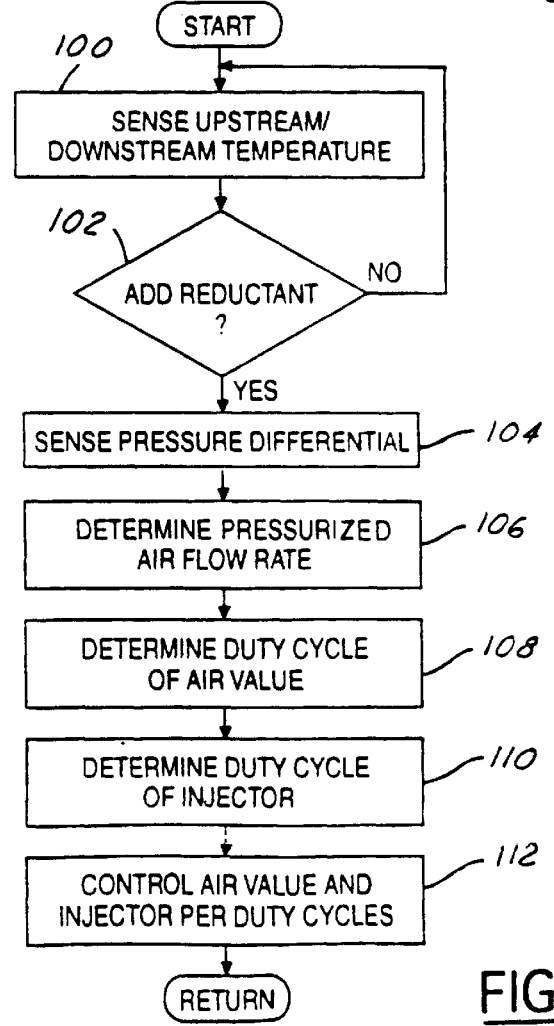
FIG. 2 is a logic flow diagram describing one method of operating the exhaust gas purification system of FIG. 1.

The operation of the exhaust gas purification system will now be described with reference to FIGS. 1 and 2. Pressurized air from the turbocharger compressor 31 fills the reservoir 30. The check valve 32 keeps the pressurized air from bleeding out of the reservoir and back into the compressor 31. As shown in FIG. 2, the engine control unit senses the upstream and downstream temperature of the catalyst 40 in step 100, by way of the upstream and downstream temperature sensors 50, 52 respectively. The upstream and downstream temperature sensors 50, 52 aid the engine control unit 18 in determining whether or not reductant is to be injected into the exhaust gas flow. For example, there are times such engine cold start operation, or extended idle, when the catalyst 40 is relatively cool and outside its prime operating mode and does not require reductant injection because of the relatively higher concentrations of unburned hydrocarbons in the exhaust gas flow. By known methods, the engine control unit 18 determines when it is necessary to add reductant to the exhaust gas flow at step 102.

Although the preferred system includes temperature sensors 50, 52, alternative exhaust system sensors may be used. For example, upstream and downstream NO sensors could be used to directly measure the catalyst conversion efficiency.

The pressure differential across the chamber 36 and exhaust gas flow 48 is sensed by the differential pressure transducer 46 at step 104, and the signal is supplied to the engine control unit 18. Based on the differential pressure measured in step 104, the engine control unit 18 determines the pressurized air flow rate required for consistent reductant metering and atomization in step 106. From this step, the duty cycle of the air valve 34 is determined in step 108 as well as the duty cycle of the injector 42 at step 110. Preferably, the engine control unit varies a pulse width modulated (PWM) signal to the air valve 34 to keep the pressure differential as measured by the differential pressure transducer 46 constant.

The engine control unit 18 then controls the air valve 34 and injector 42 at step 112 in accordance with the duty cycles determined in steps 108 and 110. Upon activation, reductant is injected into the chamber 36 by the nozzle 42. At the same time, pressurized air is introduced into the chamber 36 by the air valve 34. The atomized reductant and air mixture then travels along the conduit 38 and is introduced into the exhaust gas flow 48 upstream of the catalyst 40.

The upstream and downstream temperature sensors 50, 52 also serve the additional function of error detection in the exhaust gas purification system 10. For example, the temperature sensors 50 and 52 can monitor the temperature rise due to exothermic catalyst reactions and signal malfunctions in the air valve 34, injector 42, or the differential pressure transducer 46.

Although the engine control unit 18 preferably maintains the pressure differential as measured by the pressure differential transducer 46 constant, there are times when a lower pressure drop across the transducer 46 is preferred to conserve the pressurized air supply in the reservoir 30. For example, air flow into and out of the chamber 36 is desirable and necessary to ensure that the orifice at the tip of the conduit 38 does not plug with exhaust gas deposits. However, the turbocharger 20 does not necessarily deliver pressurized air to the reservoir 30 at all times. It is, therefore, necessary to meter the pressurized air from the reservoir as economically as possible. Accordingly, the engine control unit senses the exhaust gas temperature from the upstream temperature 50 as well as from engine control sensor 16 such as the engine speed, vehicle speed, and/or accelerator pedal position to infer whether the engine is at idle. While the engine is at idle or under conditions where reductant delivery is not required such as cold start operation, the engine control unit 18 modulates the PWM signal to air valve 34 to maintain a lower pressure drop across the pressure transducer 46 to conserve the pressurized air supply in the reservoir 30.

From the foregoing, it will be seen that there has been brought to the art a new and improved exhaust gas purification system which has advantages over conventional reductant delivery systems. While the invention has been described in connection with one or more embodiments, it will be understood that the invention is not limited to those embodiments. On the contrary, the invention covers all alternatives, modifications, and equivalents as may be included within the spirit and scope of the appended claims.

What is claimed is:

1. An exhaust gas purification system for an engine equipped with a turbocharger and an exhaust pipe having a $NO_x$ conversion catalyst therein, the system comprising:

a reservoir for storing pressurized air received from the turbocharger;

a reductant injector in fluid communication with a reductant supply, the reductant injector responsive to an injection signal for atomizing and injecting a quantity of reductant; and a mixing chamber in fluid communication with the reservoir and connected to the reductant injector, the mixing chamber in fluid communication with the exhaust pipe for introducing a quantity of air and reductant mixture from the reservoir and reductant injector into the exhaust gas flow upstream of the $NO_x$ conversion catalyst.

2. The exhaust gas purification system of claim 1 further comprising a valve connected between the reservoir and the mixing chamber, the valve responsive to a valve control signal for introducing a quantity of pressurized air from the reservoir into the mixing chamber.

3. The exhaust gas purification system of claim 1 further comprising upstream and downstream temperature sensors located upstream and downstream, respectively, of the NOx conversion catalyst for monitoring the temperature differential across the $NO_x$ conversion catalyst.

4. The exhaust gas purification system of claim 1 downstream NO sensors located upstream and downstream, respectively, of the $NO_x$ conversion catalyst for determining the conversion efficiency of the catalyst.

5. The exhaust gas purification system of claim 2 further comprising a differential pressure transducer positioned between the mixing chamber and the exhaust pipe for measuring the pressure differential across the mixing chamber and exhaust pipe upstream of the NOx conversion catalyst.

6. The exhaust gas purification system of claim 5 further comprising an engine control unit including a microprocessor and associated memory, the engine control unit adapted to receive as an input the pressure differential signal from the differential pressure transducer and output the valve control signal to maintain the pressure differential across the mixing chamber and exhaust pipe upstream of the NOx conversion catalyst substantially at a desired value.

7. The exhaust gas purification system of claim 6 further comprising upstream and downstream temperature sensors located upstream and downstream, respectively, of the NOx conversion catalyst, the engine control unit being adapted to receive as inputs the upstream and downstream temperature signal from the upstream and downstream temperature sensors, respectively, and output the valve control signal and reductant injection signal to achieve a desired level of $NO_x$ conversion in the $NO_x$ conversion catalyst.

8. An exhaust gas purification system for an engine equipped with a turbocharger and an exhaust pipe having a catalyst therein, the system comprising:

an engine control unit;

a reservoir for storing pressurized air received from the turbocharger;

a valve in fluid communication with the reservoir and responsive to a valve control signal for delivering a quantity of pressurized air from the reservoir;

a reductant injector in fluid communication with a reductant supply and responsive to an injection signal for atomizing and injecting a quantity of reductant; and a mixing chamber in fluid communication with the valve and connected to the reductant injector, the mixing chamber including an elongated conduit in fluid communication with the exhaust pipe for introducing a quantity of air and reductant mixture from the mixing chamber into the exhaust gas flow upstream of the catalyst;

the engine control unit including logic adapted to output the valve control signal and reductant injection signal to achieve a desired level of catalyst efficiency.

9. The exhaust gas purification system of claim 8 further comprising upstream and downstream temperature sensors located upstream and downstream, respectively, of the catalyst, the engine control unit being adapted to receive as inputs the upstream and downstream temperature signal from the upstream and downstream temperature sensors, respectively, and output the valve control signal and reductant injection signal to achieve a desired level catalyst efficiency.

10. The exhaust gas purification system of claim 8 further comprising a differential pressure transducer positioned between the mixing chamber and the exhaust pipe for measuring the pressure differential across the mixing chamber and exhaust pipe upstream of the catalyst, the engine control unit adapted to receive as an input the pressure differential signal from the differential pressure transducer and output the valve control signal to maintain the pressure differential across the mixing chamber and exhaust pipe upstream of the catalyst substantially at a desired value.

11. In an exhaust gas purification system for an engine equipped with a turbocharger and an exhaust pipe having a catalyst therein, the system comprising a reservoir for storing pressurized air received from the turbocharger, a valve in fluid communication with the reservoir and responsive to a valve control signal, a reductant injector in fluid communication with a reductant supply and responsive to an injection signal, a mixing chamber in fluid communication with the valve and connected to the reductant injector, the mixing chamber in fluid communication with the exhaust pipe, a differential pressure transducer positioned between the mixing chamber and the exhaust pipe, and an upstream and downstream temperature sensor located upstream and downstream, respectively, of the catalyst, a method for increasing the efficiency of the catalyst comprising the steps of:

determining a quantity of air to introduce into the mixing chamber from the reservoir;

determining a quantity of reductant to be injected into the mixing chamber;

outputting the valve control signal to activate the valve to deliver the desired quantity of pressurized air from the reservoir to the mixing chamber; and outputting the injection signal to activate the reductant injector to deliver the desired quantity of reductant to the mixing chamber, the quantity of air being such that the pressure within the mixing chamber is greater than pressure within the exhaust pipe upstream of the catalyst such that the air/reductant mixture is introduced into the exhaust pipe upstream of the catalyst to achieve a desired level of catalyst efficiency.

12. The method of claim 11 further including the step of receiving a differential pressure signal from the differential pressure transducer and outputting the valve control signal to maintain the pressure differential between the mixing chamber and exhaust pipe upstream of the catalyst at approximately a first value.

13. The method of claim 12 further including the step of receiving a differential pressure signal from the differential pressure transducer and determining whether the engine is operating in a cold running, and, if the engine is operating in cold running mode, outputting the valve control signal to maintain the pressure differential between the mixing chamber and exhaust pipe upstream of the catalyst at approximately a second value less than the first value.

14. The method of claim 13 wherein the step of determining whether the engine is operating in a cold running mode includes the step of monitoring the temperature differential between the upstream and downstream temperature sensors.

15. The method of claim 13 wherein the step of determining whether the engine is operating in a cold running mode includes the step of determining whether the engine is at idle.

* * * * *